United States Patent
Cummins et al.

(10) Patent No.: US 7,435,181 B2
(45) Date of Patent: Oct. 14, 2008

(54) TRIPOT BALL WITH TWO POINT CONTACT

(75) Inventors: Andrew K. Cummins, Saginaw, MI (US); Dennis Hansen, Freeland, MI (US); William Skvarla, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 99 days.

(21) Appl. No.: 11/257,557

(22) Filed: Oct. 25, 2005

(65) Prior Publication Data

US 2007/0093301 A1    Apr. 26, 2007

(51) Int. Cl.
F16D 3/205    (2006.01)
(52) U.S. Cl. .................................. 464/111; 464/905
(58) Field of Classification Search ............... 464/111, 464/132, 905
See application file for complete search history.

(56) References Cited

U.S. PATENT DOCUMENTS

| | | | |
|---|---|---|---|
| 4,437,219 A | 3/1984 | Dore | |
| 4,482,336 A | 11/1984 | Orain | |
| 4,565,540 A | 1/1986 | Orain | |
| 4,589,856 A | 5/1986 | Mazziotti et al. | |
| 4,674,993 A | 6/1987 | Mazziotti et al. | |
| 4,747,803 A | 5/1988 | Kimata et al. | |
| 4,773,890 A * | 9/1988 | Iwasaki et al. | 464/111 |
| 4,786,270 A | 11/1988 | Iwasaki | |
| 4,810,232 A | 3/1989 | Farrell et al. | |
| 4,988,327 A | 1/1991 | Orain | |
| 5,203,741 A | 4/1993 | Turner et al. | |
| 5,376,049 A | 12/1994 | Welschof et al. | |
| 5,391,013 A | 2/1995 | Ricks et al. | |
| 5,474,500 A * | 12/1995 | Girguis | 464/111 |
| 5,505,660 A | 4/1996 | Van Dest | |
| 5,507,693 A | 4/1996 | Schwärzler et al. | |
| 5,538,473 A | 7/1996 | Busch et al. | |
| 5,571,047 A | 11/1996 | Stall et al. | |

(Continued)

*Primary Examiner*—Greg Binda
(74) *Attorney, Agent, or Firm*—Michael D. Smith

(57) ABSTRACT

The universal joint includes an outer joint member having a rotational axis and three guide grooves extending parallel to its rotational axis. The three guide grooves are equally circumferentially spaced about the axis and each has opposed side portions. The universal joint also includes an inner joint member disposed inside the outer member. The inner joint member has a rotational axis and three arms equally spaced about this rotational axis extending radially into the guide grooves of the outer joint member. Each aim carries a roller having an external surface which engages the opposed side portions of the guide groove into which the arm extends. The roller is constrained to roll along the guide groove and each roller being able to rotate about, move lengthwise of, and tilt relative to the arm by which it is carried. The cross-sectional shape of the external surface of each roller is of a truncated arc shape and the cross-sectional shape of each guide groove side portion is different from the truncated arc shape of the roller external surface. The roller external surface and each guide groove side portion have angular contact engagement with one another at two spaced points which lie in the roller external surface and guide groove side portion. A radius of the arcuate shape of the external surface extends from a point at least as close to the roller external surface as a plane centered with respect to said roller along a path extending normal to the external surface.

9 Claims, 3 Drawing Sheets

U.S. PATENT DOCUMENTS

| | | | |
|---|---|---|---|
| 5,658,199 | A | 8/1997 | Ricks et al. |
| 5,791,995 | A | 8/1998 | Kudo et al. |
| RE36,163 | E | 3/1999 | Ricks et al. |
| 5,989,124 | A | 11/1999 | Goto et al. |
| 6,033,311 | A | 3/2000 | Bartlett |
| 6,168,528 | B1 | 1/2001 | Ishijima et al. |
| 6,200,224 | B1 * | 3/2001 | Sugiyama et al. ........... 464/111 |
| 6,217,454 | B1 | 4/2001 | Ikeda et al. |
| 6,264,565 | B1 | 7/2001 | Sugiyama et al. |
| 6,431,986 | B2 | 8/2002 | Olszewski |
| 6,572,481 | B1 | 6/2003 | Margerie |
| 6,632,143 | B2 | 10/2003 | Sugiyama et al. |
| 6,699,134 | B2 | 3/2004 | Sams et al. |
| 6,726,570 | B2 | 4/2004 | Sugiyama et al. |
| 6,733,394 | B2 | 5/2004 | Kura et al. |
| 6,749,516 | B2 | 6/2004 | Margerie |
| 6,758,758 | B2 | 7/2004 | Perrow |
| 6,776,719 | B2 | 8/2004 | Perrow |
| 6,837,794 | B1 | 1/2005 | Goto et al. |
| 6,902,486 | B2 | 6/2005 | Wette |

* cited by examiner

US 7,435,181 B2

TRIPOT BALL WITH TWO POINT CONTACT

FIELD OF THE INVENTION

This invention relates to a universal joint and more particularly a tripot universal joint.

BACKGROUND OF THE INVENTION

Tripot universal joints are typically employed in automotive axial driveshafts and especially in front-wheel-drive vehicles between the transaxial differential and the driving wheel. The telescopic constant velocity joint such as the tripot should not only transmit the torque at various speeds, angles and telescopic positions but also prevent any vibrations of the engine from being transmitted through the joint and driveshaft to the driving wheel and the vehicle structure. In addition, when the universal joint operates at an angle it should not produce any oscillating axial excitation which may be capable of initiating vibrations in the driveshaft or in the structure of the vehicle.

U.S. Pat. No. 5,203,741 discloses a constant velocity ratio universal joint of the tripod type, comprising an outer joint member with three guide grooves, and an inner joint member with arms each carrying a roller which is able to rotate about, move lengthwise of, and tilt relative to the arm, wherein both the external surface of the roller and each side portion of a guide groove engaged thereby is of a gothic arch cross sectional shape to provide for angular contact between roller and guide groove and improve the guidance of the roller so that it remains aligned in the groove for rolling therealong and with the gothic arch section of the roller and/or guide groove side comprising arcuate portions with different centers of curvature, or having part-elliptical or part-involute portions. The external surface of the roller is a surface of revolution described by rotating, about a central axis of the roller, a line in the shape of a truncated gothic arch, with a flat surface facing the guide groove. As a result, the roller and guide groove side portion engage one another at two spaced points.

SUMMARY OF THE INVENTION AND ADVANTAGES

The invention provides a constant velocity ratio universal joint of the tripot type. The universal joint includes an outer joint member having a rotational axis and three guide grooves extending parallel to its rotational axis. The three guide grooves are equally circumferentially spaced about the axis and each has opposed side portions. The universal joint also includes an inner joint member disposed inside the outer member. The inner joint member has a rotational axis and three arms equally spaced about this rotational axis extending radially into the guide grooves of the outer joint member. Each arm carries a roller having an external surface which engages the opposed side portions of the guide groove into which the arm extends. The roller is constrained to roll along the guide groove and each roller being able to rotate about, move lengthwise of, and tilt relative to the arm by which it is carried. The cross-sectional shape of the external surface of each roller is of a truncated arc shape and the cross-sectional shape of each guide groove side portion is different from the truncated arc shape of the roller external surface. The roller external surface and each guide groove side portion have angular contact engagement with one another at two spaced points which lie in the roller external surface and guide groove side portion. A radius of the arcuate shape of the external surface extends from a point at least as close to the roller external surface as a plane centered with respect to said roller along a path extending normal to the external surface.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
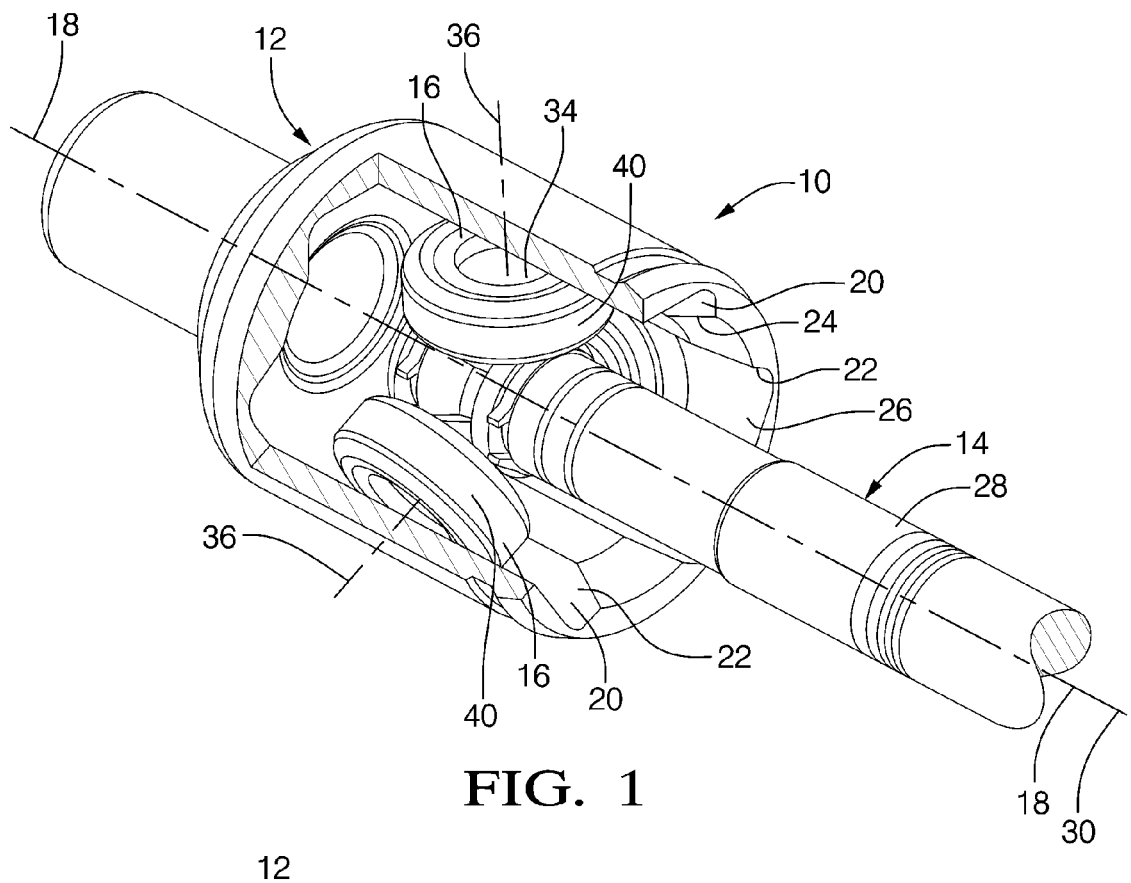
FIG. 1 is a perspective view of a tripot universal joint according to a first exemplary embodiment of the invention with a portion of an outer drive member removed to show internal detail.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Figure 2:
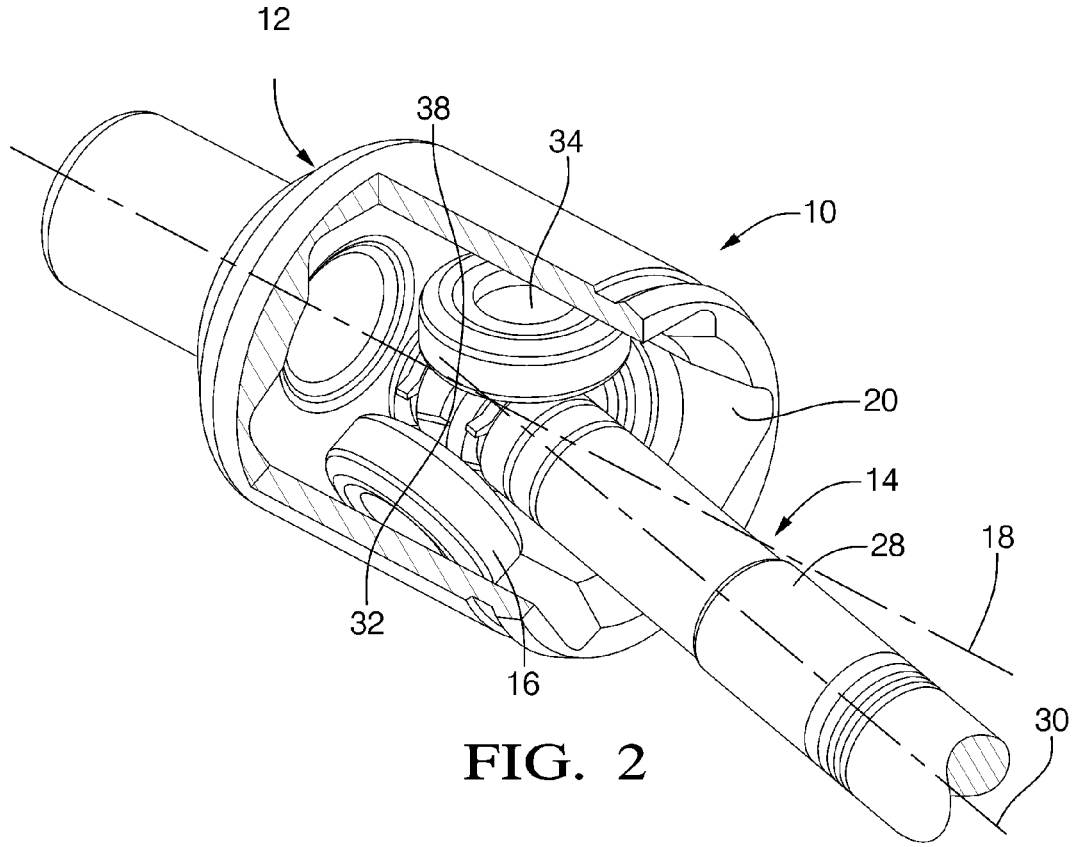
FIG. 2 is a second perspective view of the tripot universal joint with an inner drive member angled with respect to the outer drive member.

Referring now to FIGS. 1 and 2, a tripot universal joint 10 includes a housing or outer drive member 12, an inner drive member 14 and three drive roller or semi-spherical ball assemblies 16. The outer drive member 12 has a longitudinal axis 18 about which it rotates and three radial guide grooves 20 which are equally spaced at substantially 120 degrees from each other and parallel to the axis 18. Each of the guide grooves 20 has two opposing concave side portions 22, 24 separated circumferentially by a longitudinal back surface 26 which faces radially inward. The inner drive member 14 has a shaft 28 and a longitudinal axis 30 about which the shaft 28 rotates. The longitudinal axis 18 and 30 coincide or are colinear when the tripot universal joint 10 is at zero angle, as shown in FIG. 1, and intersects at a point on the longitudinal axis 18 when the tripot universal joint 10 is articulated or bent at an angle as shown in FIG. 2. The axis 18 and 30 intersect at a point on the longitudinal axis 18 which is spaced from a joint center 32.

The inner drive member 14 has three radial arms 34 equally spaced at 120 degrees from each other about the axis 30 on co-planar radial axis 36 which intersect the longitudinal axis 30 perpendicularly at a spider center 38. The spider center 38 lies on the longitudinal axis 18 of the outer drive member 12 at zero angle and is displaced radially from the longitudinal axis 18 and orbits around the joint center 32 at three times the joint speed when the tripot universal joint 10 is articulated and rotated at a given speed. Each of the arms 34 extend into one of the guide grooves 20 of the outer joint member 12.

Each one of the radial arms 34 carries a roller 40 of the ball assembly for engaging the corresponding guide groove 20. In one exemplary embodiment of the invention, each arm 34 can have a convex or semi-spherical surface which is concentric to the radial axis 36. The ball assemblies 16 can be mounted on the radial arms 34 both rotatably and pivotally. Disposed directly radially outward from the semi-spherical surface of the arms 34 could be an annular inner roller or ball which has an inner radial concave mating surface which conforms to the semi-spherical surface of the arms 34 so that the ball assembly 16 can tilt or pivot with respect to the radial axis 36. The roller 40 can be radially outwardly disposed relative to the inner roller and rotate with respect to the inner ball via a train of needle bearings or rollers disposed directly radially between the outer roller 40 and the inner ball. Such an arrangement is shown in U.S. Pat. No. 6,758,758, which is hereby incorporated by reference.

The roller 40 has an external surface 42 which engages the opposed side portions 22, 24 of the guide groove 20 into which the aim 34 extends so that the roller 40 is constrained to roll therealong. Each roller 40 is able to rotate about, move lengthwise of, and tilt relative to the arm 34 by which it is carried.

The cross-sectional shape of said external surface 42 of each roller 40 includes a thickness 53 and is at least partially of arcuate shape. A radius 54 of the arcuate shape of the external surface 42 is centered at a point 56 and includes a length that is equal to or less than one half (½) the thickness 53 of the roller 40. In other words, the radius 54 is no larger than one half (½) the thickness 53 of the roller 40. If the radius 54 is equal to one half (½) the thickness 53 of the roller 40, then the point 56 is positioned on a plane 50, which is centered with respect to the roller 40 along a path extending normal to the external surface 42. In other words, the arcuate shape is not part of a Gothic arch.

Figure 3:
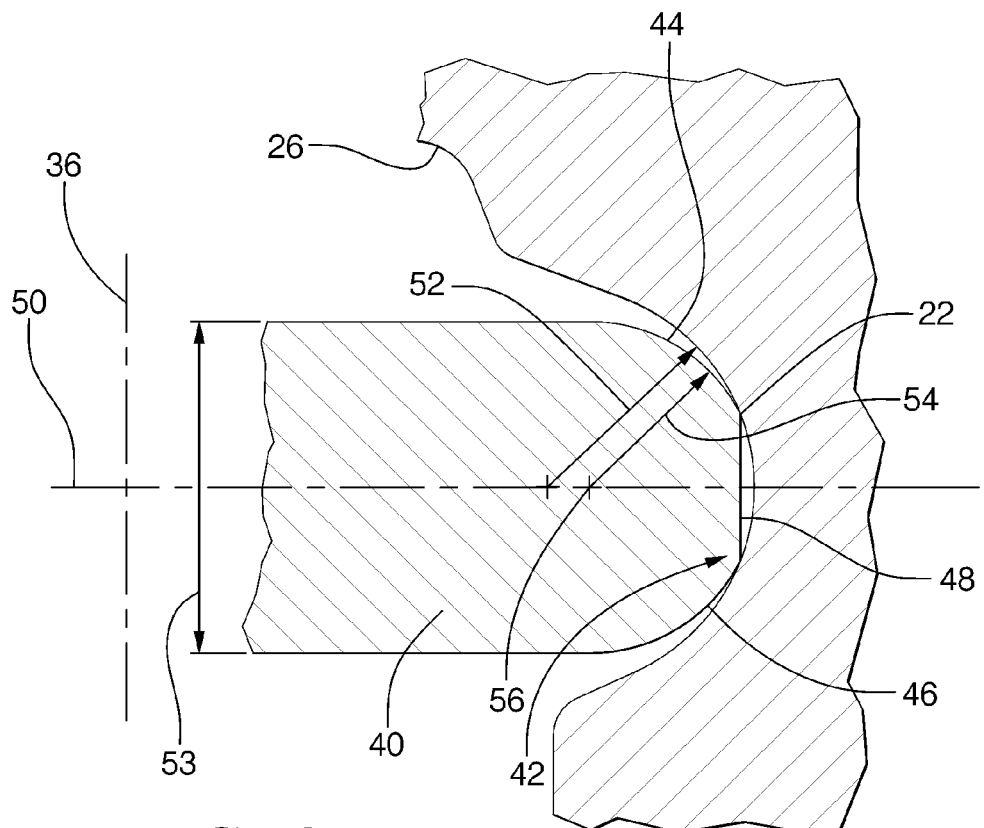
FIG. 3 is a partial cross-sectional view of the engagement between a roller and a guide groove of the first exemplary embodiment of the invention.

In the first exemplary embodiment shown in FIG. 3, the cross-sectional shape of the external surface 42 of each roller 40 is of a truncated arcuate shape. Specifically, the first exemplary surface 42 has a truncated semi-circle shape. For example, the surface 42 includes first and second arc portions 44, 46 having the same size radius and centered at the same point 56. The radius 54 is equal to one half (½) the thickness 53 of the roller 40, thereby positioning the point 56 on the plane 50, with the radius 54 being normal to the external surface 42.

The surface 42 also includes a truncated portion 48 extending between the first and second arc portions 44, 46. The truncated portion 48 is shown as being straight in FIG. 3, but could be slightly arcuate and/or blended between the first and second arc portions 44, 46 and still be spaced from the side portion 22. The surface 42 engages the side portion 22 tangentially.

As set forth above, the cross-sectional shape of each guide groove side portion 22, 24 is of a semi-circular shape in the first exemplary embodiment of the invention. In other words, the cross-sectional shape of each guide groove side portion 22, 24 is not a Gothic arch in the first exemplary embodiment of the invention. The shape of each guide groove side portion 22, 24 is different from the truncated arcuate shape of the roller external surface 42. As best seen in FIG. 3, the radius 52 of the side portion 22 is greater than the radius 54 of the arcuate portions 44, 46 of the surface 42. As a result, the roller external surface 42 and each guide groove side portion 22, 24 have angular contact engagement with one another at two spaced points which lie in the roller external surface 42 and guide groove side portion 22.

Figure 4:
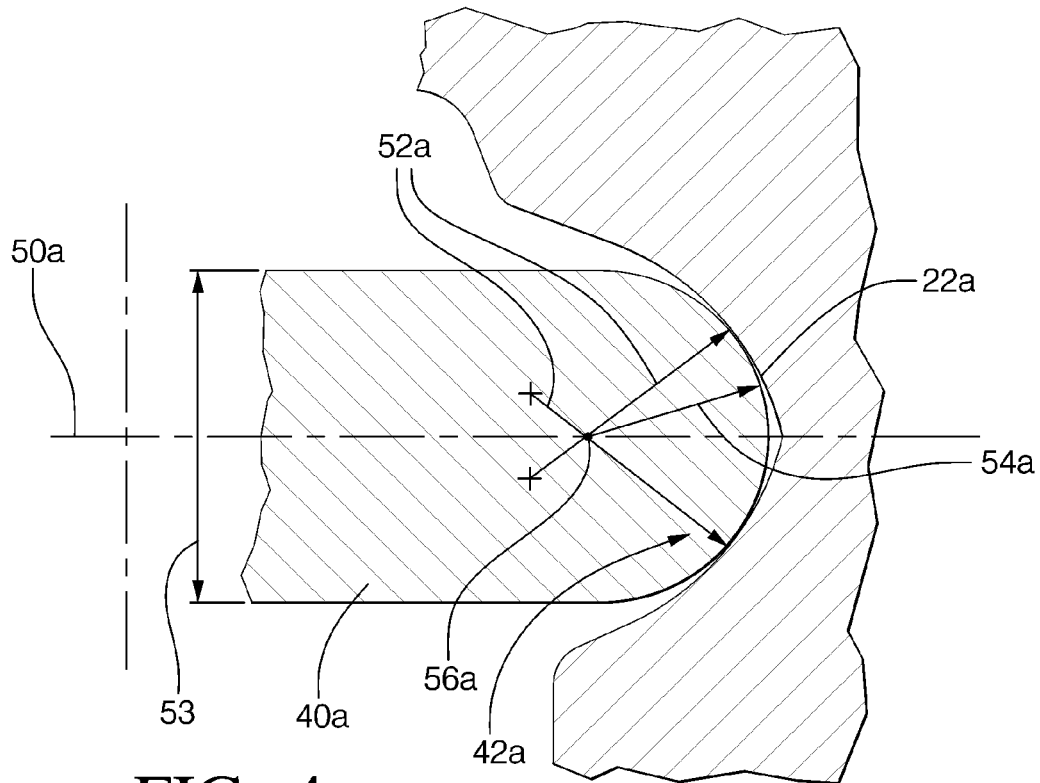
FIG. 4 is a partial cross-sectional view of the engagement between a roller and a guide groove of a second exemplary embodiment of the invention.

As shown in FIG. 4, in a second embodiment of the invention, two radii 52a of the groove side portion 22a cooperate to form a Gothic arch. The external surface 42a of the roller 40a is defined by the radius 54a extending from the point 56a. The point 56a is on the plane 50a. The external surface 42a of the roller 40a is of a semi-circular arcuate shape and is spaced from the groove portion 22a.

Figure 5:
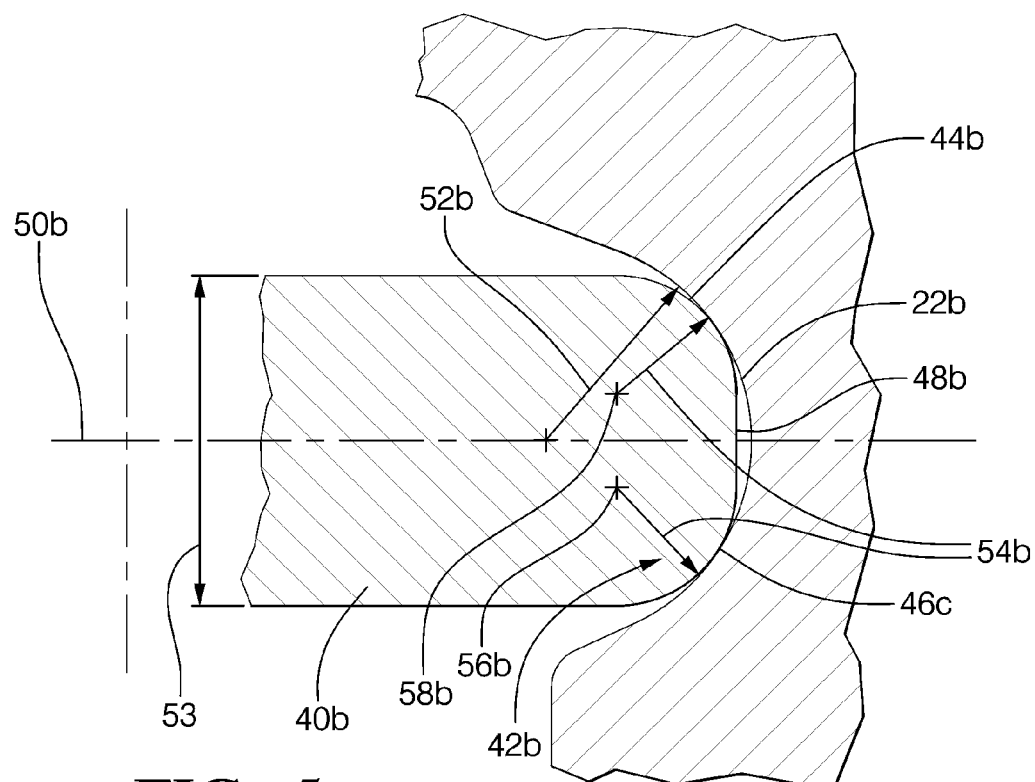
FIG. 5 is a partial cross-sectional view of the engagement between a roller and a guide groove of a third exemplary embodiment of the invention.

As shown in FIG. 5, in a third embodiment of the invention, the radius 52b of the groove side portion 22b defines a semi-circular shape. The external surface 42b of the roller 40b is defined by two radii 54b defining first and second arcuate portions 44b, 46b. A truncated portion 48b extends between the first and second arcuate portions 44b, 46b. Each radius 54b is closer to the corresponding arcuate portion 44b, 46b than the plane 50b along respective paths normal to the respective arcuate portions 44b, 46b. The respective origins 56b, 58b of the two radii 54b are offset from one another, mirrored from one another relative to the plane 50b.

Figure 6:
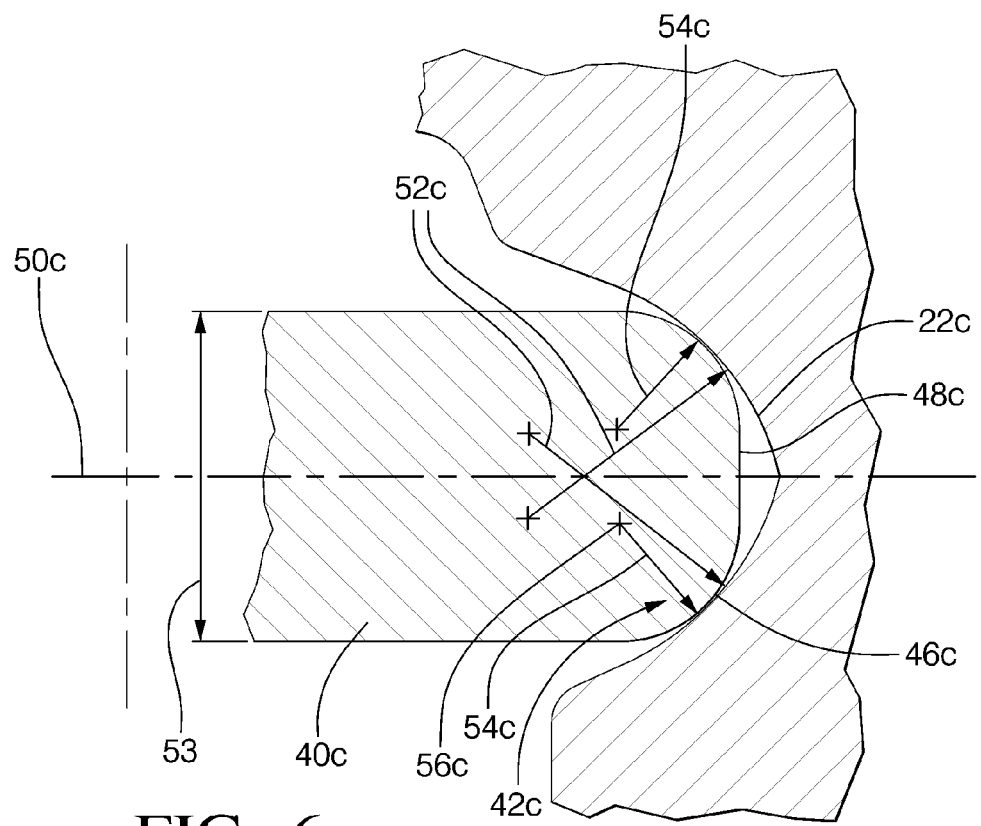
FIG. 6 is a partial cross-sectional view of the engagement between a roller and a guide groove of a fourth exemplary embodiment of the invention.

As shown in FIG. 6, in a fourth embodiment of the invention, two radii 52c of the groove side portion 22c cooperate to form a Gothic arch. The external surface 42c of the roller 40c is defined by two radii 54c defining first and second arcuate portions 44c, 46c. A truncated portion 48c extends between the first and second arcuate portions 44c, 46c. Each radii 54c is closer to the corresponding arcuate portion 44c, 46c than the plane 50c along respective paths normal to the respective arcuate portion 44c, 46c. The respective origins 56c, 58c of the two radii 54c are offset from one another, mirrored from one another relative to the plane 50c.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A constant velocity ratio universal joint of the tripot type comprising:

an outer joint member having a rotational axis and three guide grooves extending parallel to its rotational axis and equally circumferentially spaced thereabout, each guide groove having opposed side portions;

an inner joint member disposed inside the outer member, having a rotational axis and three arms equally spaced about this rotational axis and extending radially into the guide grooves of the outer joint member; and each arm carrying a roller having a thickness and an external surface which engages said opposed side portions of the guide groove into which the aim extends so that the roller is constrained to roll therealong;

wherein the cross-sectional shape of said external surface of each roller is of an arcuate shape, and the cross-sectional shape of each guide groove side portion is different from said arcuate shape of the roller external surface, said roller external surface and each guide groove side portion having angular contact engagement with one another at two spaced points which lie in said roller external surface and guide groove side portion, and wherein a radius of said arcuate shape of said external surface is equal to or less than one half of said thickness of said roller.

2. The constant velocity ratio universal joint of claim 1 wherein:

said roller external surface is of truncated arcuate shape with first and second arc portions and a truncated portion disposed between said first and second arc portions.

3. The constant velocity ratio universal joint of claim 2 wherein said first and second arc portions are centered on the same point.

4. The constant velocity ratio universal joint of claim 2 wherein:

said cross-sectional shape of each guide groove side portion is of semi-circular shape.

5. The constant velocity ratio universal joint of claim 1 wherein:

said roller external surface is of semi-circular arcuate shape.

6. The constant velocity ratio universal joint of claim 5 wherein:

said cross-sectional shape of each guide groove side portion is of Gothic arch shape.

7. The constant velocity ratio universal joint of claim 1 wherein:

said roller external surface is of truncated arcuate shape with first and second arc portions centered on different points and a truncated portion disposed between said first and second arc portions.

8. The constant velocity ratio universal joint of claim 7 wherein:

said cross-sectional shape of each guide groove side portion is of semi-circular shape.

9. The constant velocity ratio universal joint of claim 7 wherein:

said cross-sectional shape of each guide groove side portion is of Gothic arch shape.

* * * * *